(12) United States Patent
Lafontaine

(10) Patent No.: US 7,672,759 B1
(45) Date of Patent: Mar. 2, 2010

(54) COMMUNICATION WITH A STEERING WHEEL SWITCH

(75) Inventor: Yvan Lafontaine, Grand-Mère (CA)

(73) Assignee: Teleflex Megatech, Inc., Grand-Mere (CA)

( * ) Notice: Subject to any disclaimer, the term of this patent is extended or adjusted under 35 U.S.C. 154(b) by 1347 days.

(21) Appl. No.: 11/064,091

(22) Filed: Feb. 24, 2005

Related U.S. Application Data

(60) Provisional application No. 60/546,944, filed on Feb. 24, 2004.

(51) Int. Cl.
*B60L 3/00* (2006.01)

(52) U.S. Cl. .............................. 701/21; 701/1; 33/232; 318/588; 440/84; 340/984

(58) Field of Classification Search .................. 701/21; 33/232; 318/588; 440/84
See application file for complete search history.

(56) References Cited

U.S. PATENT DOCUMENTS

| | | | |
|---|---|---|---|
| 3,652,868 A | 3/1972 | Hunt | |
| 3,789,231 A | 1/1974 | Hayden | |
| 3,857,359 A | 12/1974 | Ward et al. | |
| 4,405,924 A | 9/1983 | Shinoda | |
| 4,438,425 A | 3/1984 | Tsuchida et al. | |
| 4,456,903 A | 6/1984 | Kishi et al. | |
| 4,514,645 A | 4/1985 | Endo et al. | |
| 4,604,912 A | 8/1986 | Sugita et al. | |
| 4,609,904 A | 9/1986 | Paine | |
| 4,628,310 A | 12/1986 | Reighard et al. | |
| 4,638,131 A | 1/1987 | Kidd | |
| 4,672,214 A | 6/1987 | Takahashi | |
| 4,678,906 A | 7/1987 | Rudi et al. | |
| 4,737,761 A | 4/1988 | Dosjoub et al. | |
| 4,757,213 A | 7/1988 | Tigges et al. | |
| 4,766,326 A | 8/1988 | Hayashi et al. | |
| 4,772,799 A | 9/1988 | Inui | |
| 4,792,783 A | 12/1988 | Burgess | |
| 4,792,965 A | 12/1988 | Morgan | |
| 4,835,512 A | 5/1989 | Bratton | |
| 4,855,144 A | 8/1989 | Leong et al. | |
| 4,879,476 A | 11/1989 | Schweizer | |

(Continued)

FOREIGN PATENT DOCUMENTS

CA 2071681 12/1992

(Continued)

*Primary Examiner*—Khoi Tran
*Assistant Examiner*—Jonathan Sample
(74) *Attorney, Agent, or Firm*—Baker & Hostetler LLP

(57) ABSTRACT

A method and system for indicating a status of a load of a sub-system in a marine vehicle where the load is controlled by a switch provided on a steering wheel of the marine vehicle. The method comprises: providing a switch controller in the steering wheel for controlling communications between the steering wheel and the marine vehicle; providing a switch for the load on the steering wheel; providing a status indicator for the load on the steering wheel; detecting an activation of the switch by the switch controller; the switch controller transmitting a command to the load in the marine vehicle in response to the activation; providing a load controller in the marine vehicle, the load controller controlling a power input to the switch controller, the load controller receiving the command and activating the load in response to the command; detecting a status of the load; interrupting a power input to the switch controller for a predetermined interruption duration corresponding to the detected status; the switch controller activating the status indicator to indicate the detected status of the load.

21 Claims, 8 Drawing Sheets

U.S. PATENT DOCUMENTS

| | | | |
|---|---|---|---|
| 4,944,241 | A | 7/1990 | Carter |
| 4,962,495 | A | 10/1990 | Gibbons |
| 5,003,906 | A | 4/1991 | Sova |
| 5,041,817 | A | 8/1991 | Reeb |
| 5,049,082 | A | 9/1991 | Carter |
| 5,132,665 | A | 7/1992 | Hutchisson et al. |
| 5,337,694 | A | 8/1994 | Nix |
| 5,498,911 | A | 3/1996 | Bossler et al. |
| 5,515,399 | A * | 5/1996 | Swart .......................... 375/258 |
| 5,585,785 | A | 12/1996 | Gwin et al. |
| 5,666,102 | A * | 9/1997 | Lahiff ......................... 340/461 |
| 5,707,262 | A * | 1/1998 | Huntley et al. ................ 440/53 |
| 5,719,824 | A | 2/1998 | Boucher |
| 5,724,907 | A | 3/1998 | Castellucci |
| 5,787,833 | A | 8/1998 | Lewis |
| 5,810,606 | A | 9/1998 | Ballast et al. |
| 5,833,025 | A | 11/1998 | Bhandari |
| 5,855,144 | A | 1/1999 | Parada |
| 5,856,710 | A | 1/1999 | Baughman et al. |
| 5,945,744 | A | 8/1999 | Dobler et al. |
| 5,994,788 | A | 11/1999 | Dobler et al. |
| 6,012,736 | A | 1/2000 | Hansen |
| 6,054,778 | A | 4/2000 | Downs |
| 6,067,489 | A * | 5/2000 | Letang et al. ................. 701/36 |
| 6,078,252 | A * | 6/2000 | Kulczycki et al. ........ 340/425.5 |
| 6,091,779 | A | 7/2000 | Griessbach |
| 6,114,949 | A | 9/2000 | Schmitz et al. |
| 6,121,692 | A | 9/2000 | Michaels et al. |
| 6,169,339 | B1 | 1/2001 | Cripe |
| 6,232,871 | B1 * | 5/2001 | Spiess ....................... 340/10.4 |
| 6,253,131 | B1 * | 6/2001 | Quigley et al. ................ 701/36 |
| 6,262,513 | B1 | 7/2001 | Furukawa et al. |
| 6,264,513 | B1 | 7/2001 | Marsh |
| 6,271,741 | B1 | 8/2001 | Sajna |
| 6,273,771 | B1 * | 8/2001 | Buckley et al. ............... 440/84 |
| 6,292,069 | B1 | 9/2001 | Michaels et al. |
| 6,343,670 | B1 | 2/2002 | Mindl et al. |
| 6,382,122 | B1 * | 5/2002 | Gaynor et al. ........ 114/144 RE |
| 6,388,548 | B1 | 5/2002 | Saito et al. |
| 6,473,004 | B1 * | 10/2002 | Smull .......................... 340/984 |
| 6,501,361 | B1 | 12/2002 | Michaels et al. |
| 6,554,303 | B2 | 4/2003 | Benz et al. |
| 6,670,722 | B1 | 12/2003 | Kessell et al. |
| 6,698,848 | B1 * | 3/2004 | Corvin et al. ................. 303/20 |
| 6,813,166 | B1 * | 11/2004 | Chang et al. ............. 363/21.14 |
| 6,954,367 | B2 * | 10/2005 | Yang et al. .................... 363/98 |
| 2001/0056544 | A1 * | 12/2001 | Walker ....................... 713/200 |
| 2002/0041074 | A1 | 4/2002 | Benz et al. |
| 2002/0125061 | A1 | 9/2002 | Kawamura |
| 2002/0171522 | A1 | 11/2002 | Kazmierczak |
| 2003/0045977 | A1 * | 3/2003 | Sato et al. ..................... 701/35 |
| 2003/0093189 | A1 * | 5/2003 | Honda ........................... 701/1 |
| 2003/0123205 | A1 * | 7/2003 | Ashiya ........................ 361/93.1 |
| 2003/0150366 | A1 | 8/2003 | Kaufmann et al. |
| 2003/0179105 | A1 * | 9/2003 | Kazmierczak ......... 340/870.31 |
| 2004/0181322 | A1 * | 9/2004 | Okuyama .................... 701/21 |

FOREIGN PATENT DOCUMENTS

| | | |
|---|---|---|
| CA | 2073845 | 2/1993 |
| CA | 2317346 | 3/2001 |
| CA | 2318596 | 3/2001 |
| DE | 69816429 | 4/2004 |
| EP | 0183580 A1 | 6/1986 |
| EP | 0528463 A1 | 2/1993 |
| EP | 0680060 A1 | 11/1995 |
| EP | 0679554 B1 | 11/2002 |
| EP | 0969989 | 7/2003 |
| JP | 2001521463 | 11/2001 |
| WO | 0451445 A2 | 10/1991 |
| WO | 09712783 A2 | 4/1997 |

\* cited by examiner

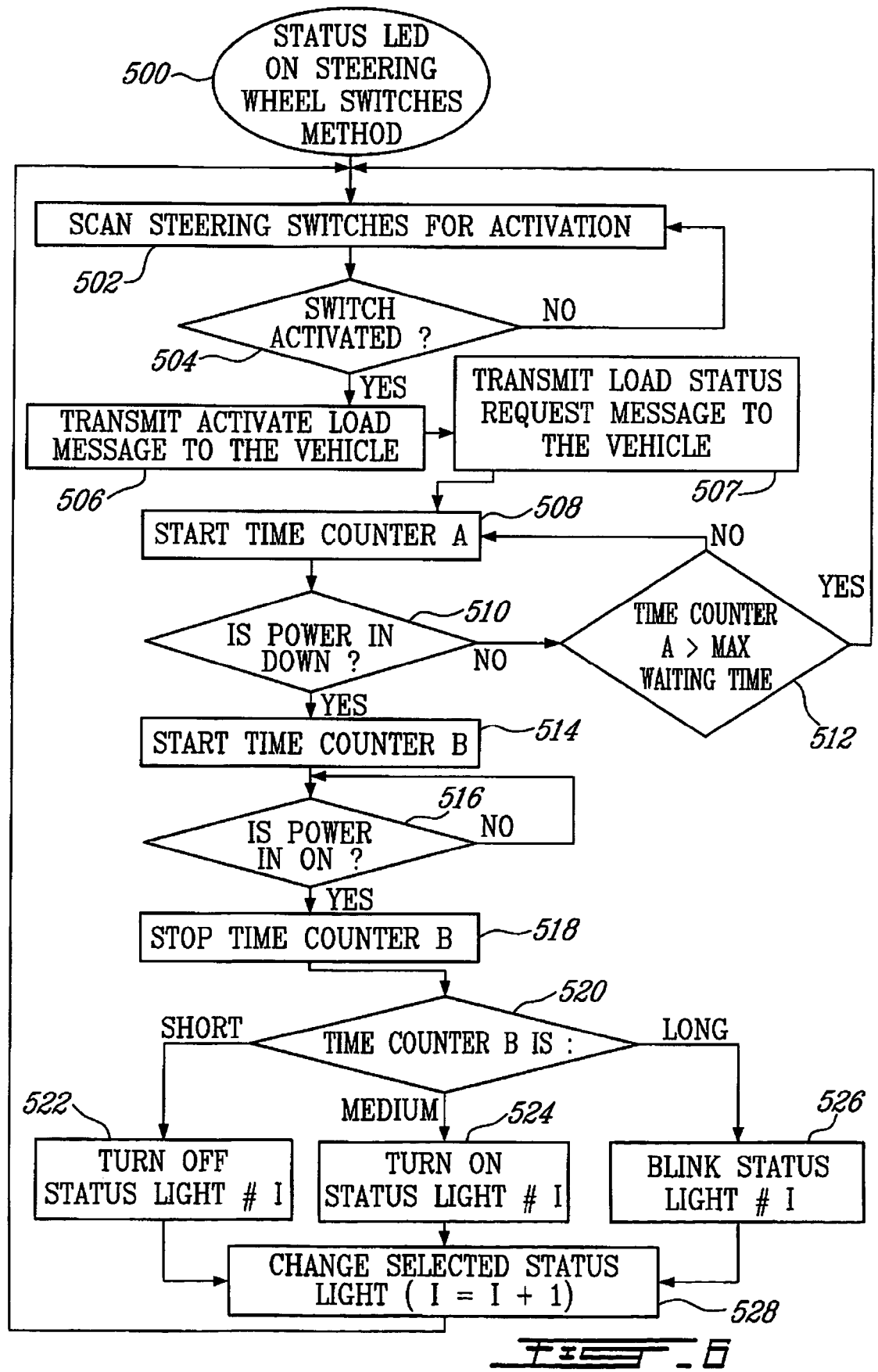

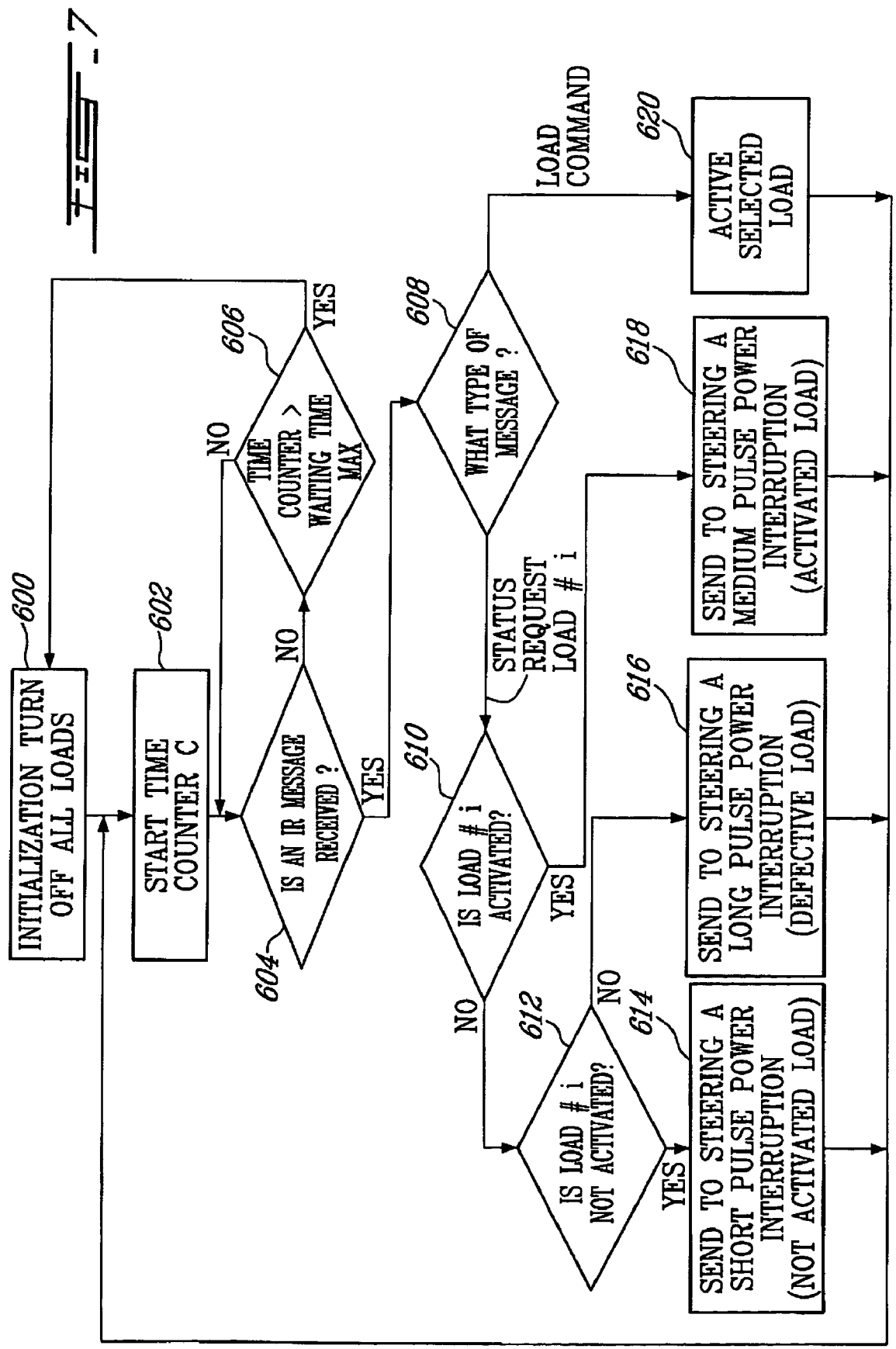

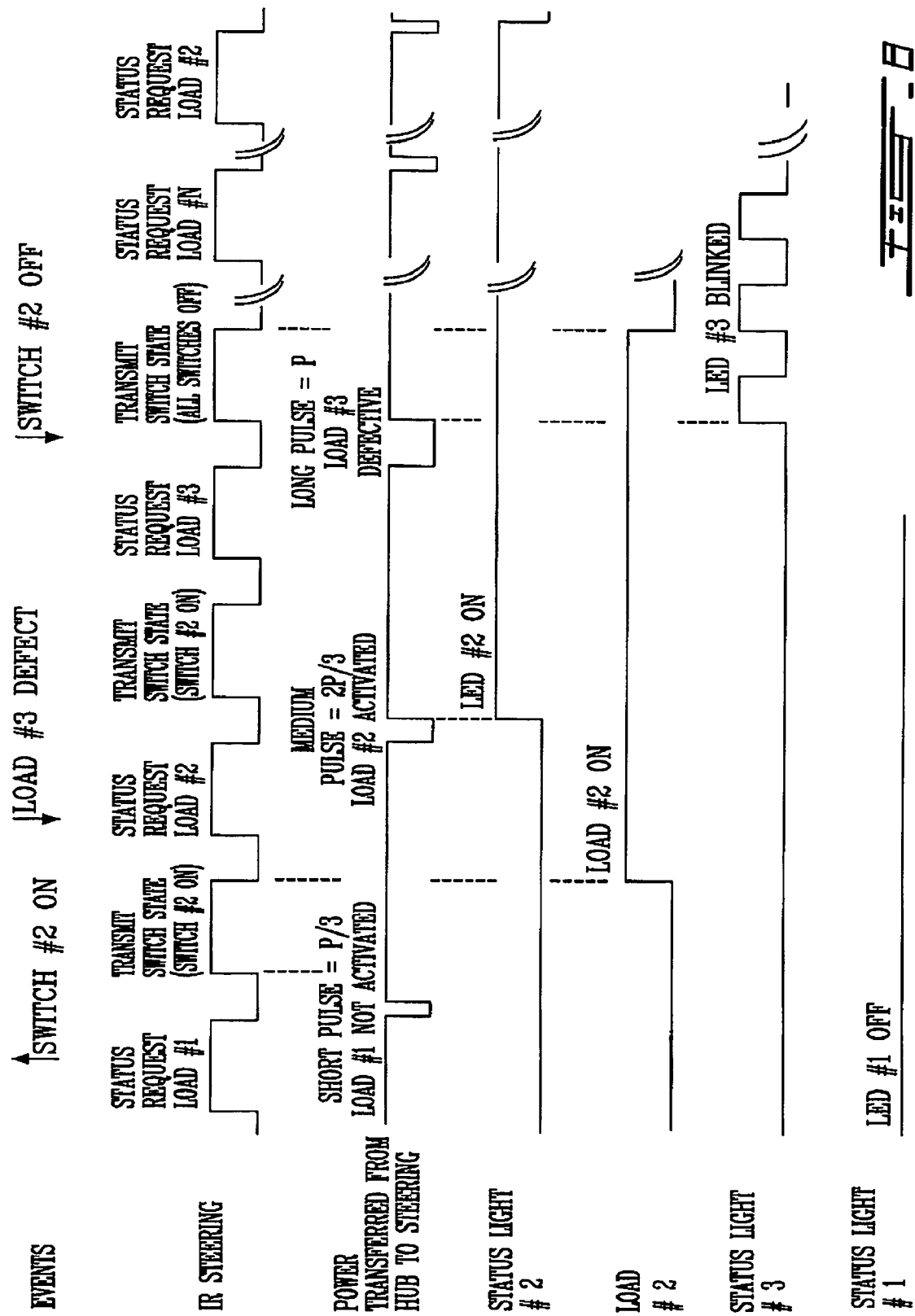

US 7,672,759 B1

COMMUNICATION WITH A STEERING WHEEL SWITCH

CROSS-REFERENCE TO RELATED APPLICATIONS

The present application claims priority of U.S. provisional patent application No. 60/546,944 filed on Feb. 24, 2004 by Applicant entitled COMMUNICATION WITH A STEERING WHEEL SWITCH and is related to co-pending U.S. patent application Ser. No. 10/961,297 filed on Oct. 12, 2004 by Applicant, entitled MARINE VEHICLE STEERING WHEEL SWITCH POWERING, to co-pending U.S. patent application Ser. No. 10/961,224 filed on Oct. 12, 2004 by Applicant, entitled STATUS LIGHT FOR SWITCH ON BOAT STEERING WHEEL and to co-pending provisional U.S. patent application Ser. No. 10/961,227 filed on Oct. 12, 2004 by Applicant entitled FUEL LEVEL VARIATION DETECTOR FOR MARINE VEHICLE, all of which are incorporated herewith by reference.

FIELD OF THE INVENTION

The invention relates to switches and indicators made available on steering wheels of marine vehicles, such as speed boats. More specifically, it relates to a communication method and system enabling data exchange between the steering wheel and the marine vehicle.

BACKGROUND OF THE INVENTION

Prior art systems provide lights on switches which are lit when the switch has been activated. Such systems allow a user to be sure that the switch has been activated, i.e. they confirm that the command was requested. These switches are provided on the dashboard of marine vehicles.

These prior art systems do not enable communication between the marine vehicle and its steering wheel nor do they allow to confirm the actual status of a subsystem subsequently to the request of the command.

SUMMARY OF THE INVENTION

Accordingly, an object of the present invention is to provide an indication that the sub-system controlled by a switch is executing the command as requested by enabling communication between the marine vehicle and its steering wheel.

According to a first broad aspect of the present invention, there is provided a method for indicating a status of a load of a sub-system in a marine vehicle where the load is controlled by a switch provided on a steering wheel of the marine vehicle. The method comprises: providing a switch controller in the steering wheel for controlling communications between the steering wheel and the marine vehicle; providing a switch for the load on the steering wheel; providing a status indicator for the load on the steering wheel; detecting an activation of the switch by the switch controller; the switch controller transmitting a command to the load in the marine vehicle in response to the activation; providing a load controller in the marine vehicle, the load controller controlling a power input to the switch controller, the load controller receiving the command and activating the load in response to the command; detecting a status of the load; interrupting a power input to the switch controller for a predetermined interruption duration corresponding to the detected status; the switch controller activating the status indicator to indicate the detected status of the load.

According to another broad aspect of the present invention, there is provided a system for indicating a status of a load of a sub-system in a marine vehicle, the load being controlled by a switch provided on a steering wheel of the marine vehicle. The system comprises: a switch controller in said steering wheel for controlling communications between said steering wheel and said marine vehicle; a switch for activating a load of said sub-system, located on said steering wheel; a status indicator for said load, on said steering wheel; a switch detector for detecting an activation of said switch; a transmitter for transmitting a command corresponding to said switch activation to said load, in said marine vehicle, in response to said switch detector; a load controller in said marine vehicle, said load controller controlling a power input to said switch controller, said load controller receiving said command and activating said load in response to said command; a status detector for detecting a status of said load; a power interrupter for interrupting a power input to said switch controller for a predetermined interruption duration corresponding to said detected status; wherein said switch controller activates said status indicator to indicate said detected status of said load.

BRIEF DESCRIPTION OF THE DRAWINGS

These and other features, aspects and advantages of the present invention will become better understood with regard to the following description and accompanying drawings wherein:

FIG. 6 is a flow chart of the steps of a method carried out by the elements provided in the steering wheel, in accordance with an embodiment of the present invention;

FIG. 7 is a flow chart of the steps of the method carried out by the elements provided in the marine vehicle, in accordance with an embodiment of the present invention; and FIG. 8 is a timing chart of exemplary communications between the steering wheel the marine vehicle in accordance with preferred embodiments of the system and method of the present invention.

DETAILED DESCRIPTION OF THE PREFERRED EMBODIMENT

In the description of the present invention, it will be assumed that the energy provided in the steering wheel is managed by a power management system and that having sufficient energy to operate the system described and carry out the steps of the method described is not an object.

Figure 1:
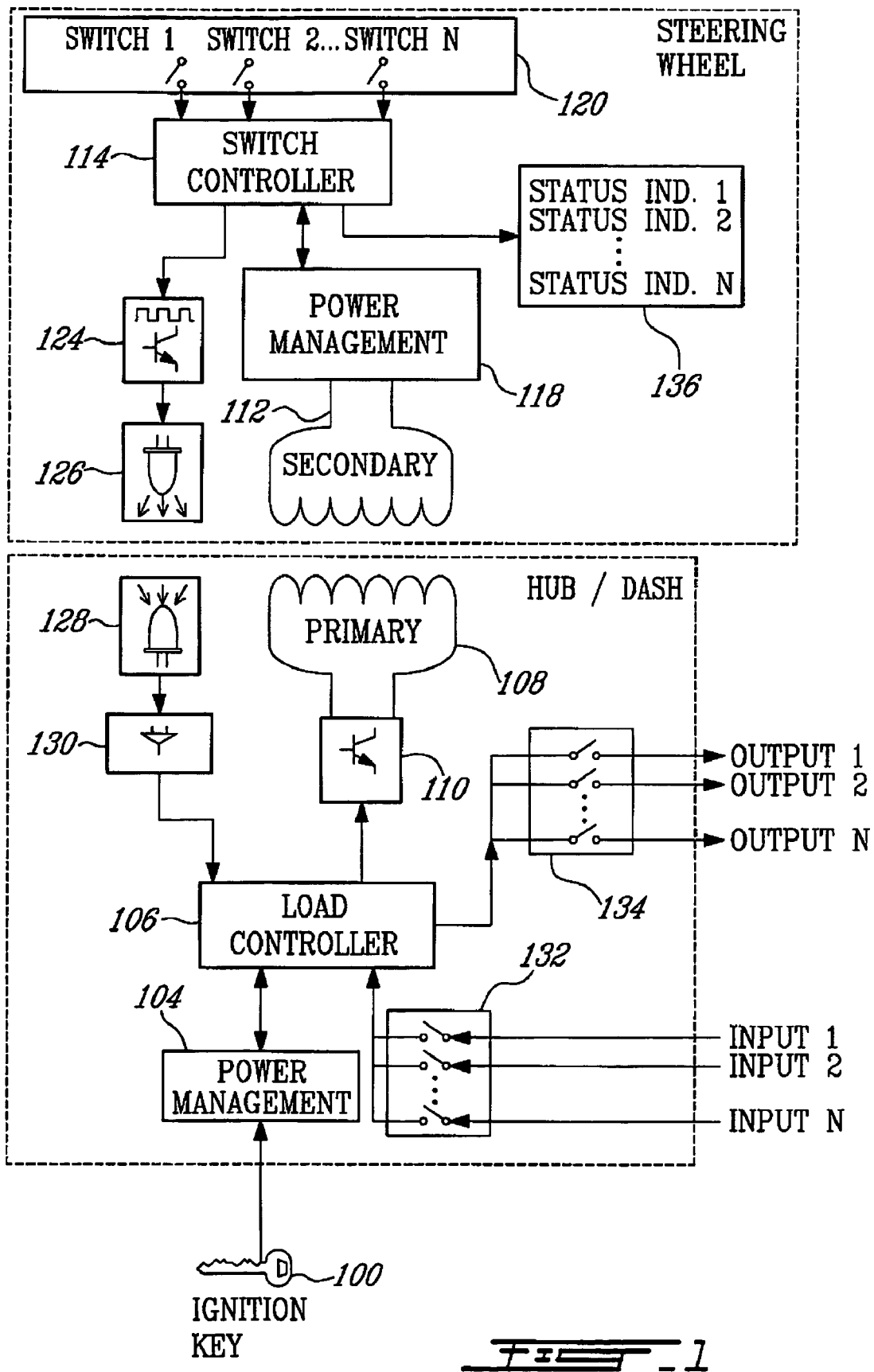
FIG. 1 is a block diagram of a system for indicating a status in accordance with an embodiment of the invention, illustrating the main components.
Figure 2:
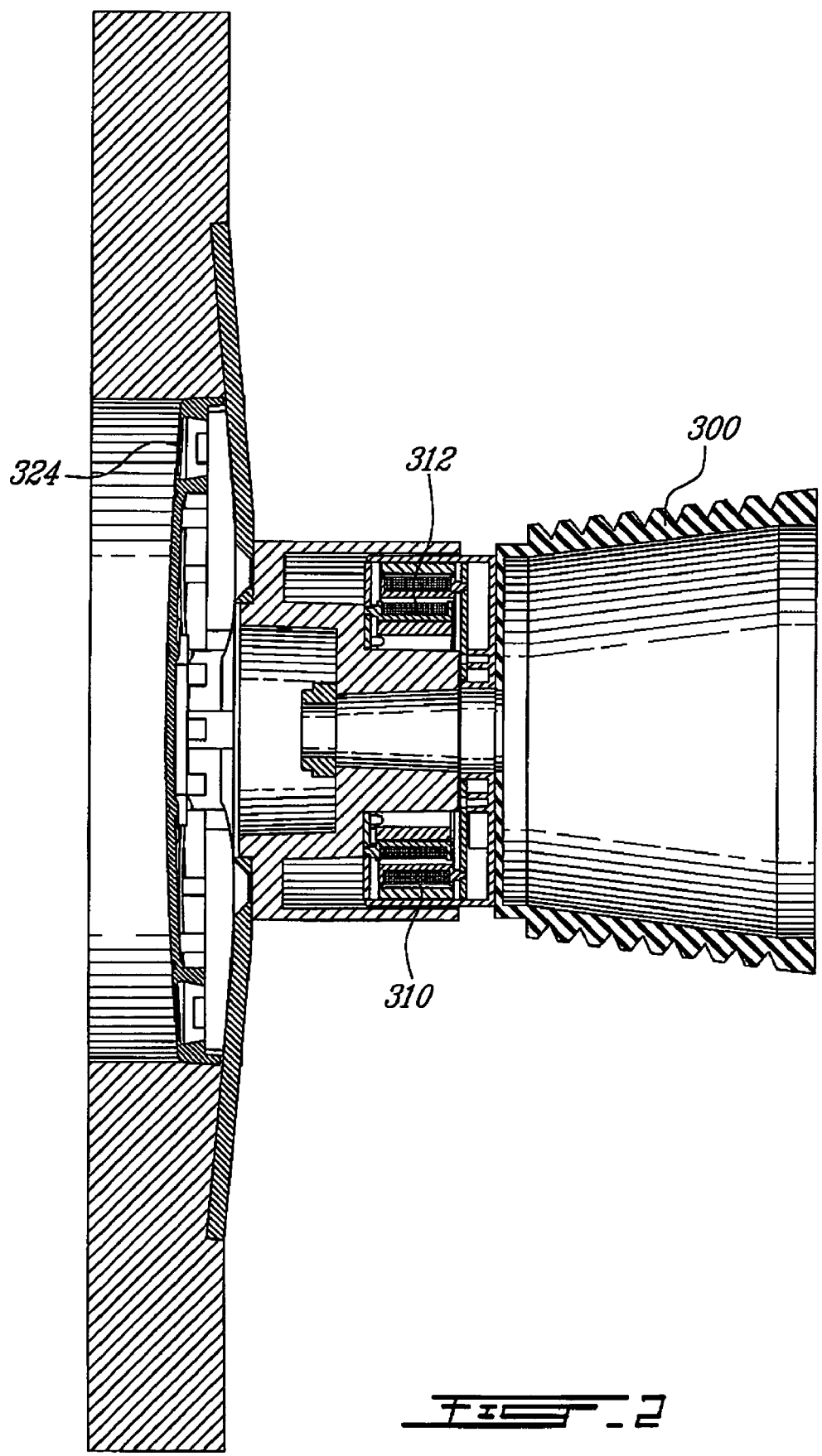
FIG. 2 is a cross-sectional view of the system for indicating a status in accordance with an embodiment of the invention, where the components are illustrated inside a steering wheel and hub assembly.
Figure 3:
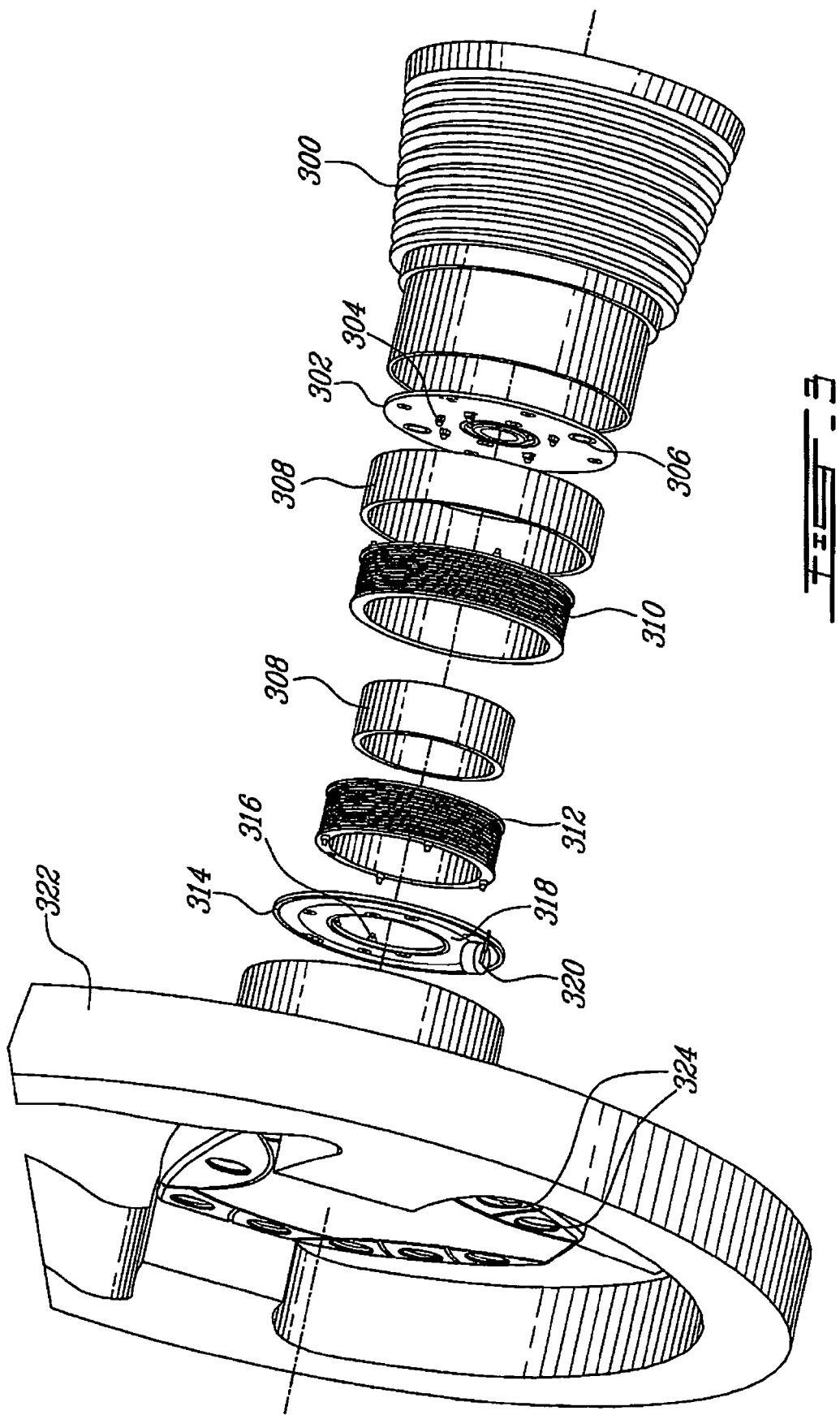
FIG. 3 is an exploded view of the system for indicating a status of FIG. 2.

With reference to FIGS. 1, 2 and 3, a preferred embodiment of the present invention will be explained in detail. A steering wheel 322 is rotatably mounted onto the hub of the marine vehicle, within the hub bellow 300. When the ignition key 100 is turned on, the 12 volt battery (not shown) of the boat is connected to an electrical circuit board 302 provided in the hub of the marine vehicle by the power management system 104. When the electrical circuit board 302 is powered on, it first generates, using a load controller 106, a waveform which will drive the primary 108 of a contactless rotary transformer through power transistors 110. The rotary transformer has a first ring shaped magnet core 308 with the primary coil 310 fixed onto the stator and a second ring shaped magnet core 308 with the secondary coil 312 fixed onto the steering wheel 322 via the rotor. The stator is located in the hub and the rotor is provided in the steering wheel. There is an air gap between the two coils making them entirely contactless. A soft magnetic material is used for these cores to make the magnetic resistance appearing in the magnetic circuit of the two coils small enough so that an AC electric energy impressed on the primary coil 108 is induced to the secondary coil 112 instantaneously. This excitation of the primary 108 will induce energy on the secondary 112 of the contactless rotary transformer. This electrical energy can be used to power the switch controller 114 of the steering wheel.

Figure 4:
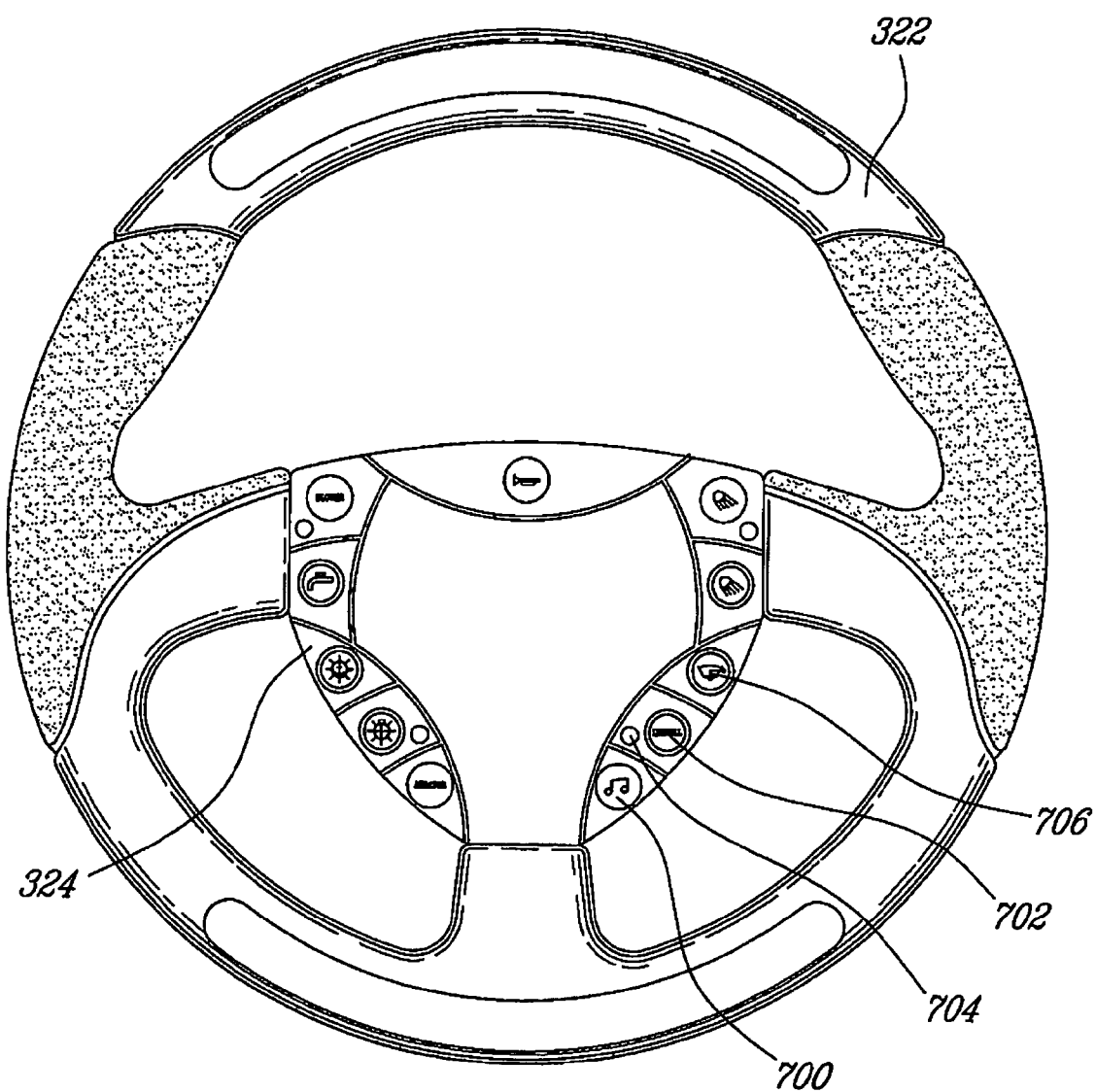
FIG. 4 is a front elevation view of a steering wheel in accordance with an embodiment of the invention, illustrating switches and status indicators.

The switch controller 114 reads the electrical signals from switches 120. The switches 120 are provided on the steering wheel and can be used to control a plurality of subsystems of the marine vehicle, such as the lights, the horn, the ventilation fan, the windshield wiper and washer, the bilge pump and blower, the emergency start, the anchor, the hazard warning, the radio, etc. The switches can be provided on a keypad that is affixed to the steering wheel. This keypad should be weather resistant if the steering wheel is not protected from the weather. The switches will typically bear pictograms or logos representing the sub-system that they control. They can also bear the name of the sub-system. Switch standards exist for marine vehicles and should be used when appropriate. An example of switch disposition on a steering wheel is illustrated in FIG. 4.

The switch controller 114 transmits a data train, created by a data driver 124, via infrared (IR) transmission using an IR emitting diode 126. The data train identifies which switch or switches are activated in the steering wheel and therefore contains the commands to which subsystem or subsystems must be activated. The data train is captured by a phototransistor 128, is received by a signal receiver 130 and is sent to the load controller 106 for communication with the proper subsystem of the boat through an output interface 134. More specifically, the interface 134 communicates the command via which a load of the subsystem is activated.

The output interface 134 has as many outputs as there are switches 120 on the steering wheel. Output interface 134 can have steady state switches or electromechanical relays. It is possible to use the output interface 134 to communicate on a data network of the boat, in which case it comprises a multiplexer. The National Marine Electronics Association has introduced the NMEA 2000 interface standard. The standard contains the requirements of a serial data communications network to inter-connect marine electronic equipment on vessels. It is multi-master and self configuring, and there is no central network controller. Equipment designed to this standard have the ability to share data, including commands and status with other compatible equipment over a single channel. If the output interface 134 is compliant with the NMEA 2000 standard, it can allow communication between the switches 120 and the subsystems of the network.

Oppositely, inputs of an input interface 132 transmit status signals from the different loads to the switch controller 114 via the load controller 106, using the method described below. The preferred load and switch controllers are microprocessors.

Preferably, the solid state switches 306, the infrared receivers 304 and the load controller are provided on a first printed circuit board 302 which is fixed to the stator portion of the steering wheel/hub assembly. A second printed circuit board is provided within the rotor portion (the steering wheel) and includes the infrared emitter 316 and the switch controller 318.

When the ignition key 100 is turned off, the load controller 106 ceases to generate a waveform and to drive the primary 108 of the transformer. Activation of the switches does not trigger any processing thereafter unless a power management system is provided which ensures that the switches, the switch controller and the emitter are maintained in a powered state regardless of the position of the ignition key. Such a power management system is described in co-pending U.S. patent application Ser. No. 10/961,297 filed on Oct. 12, 2004 by Applicant, entitled MARINE VEHICLE STEERING WHEEL SWITCH POWERING.

Preferably, the switches are provided on the steering wheel 322 and are combined with a status indicator 136 which indicates a status of the load of the sub-system that they control. Typically, the status indicator is a visual indicator, preferably a LED, which is lit when the corresponding subsystem is functioning normally. If the status led is unlit, the subsystem is inactive. Optionally, if the switch has been pressed but the corresponding sub-system is not responding or cannot execute the command, the status led can start flashing to indicate an error, and the malfunction thereof.

FIG. 4 shows the steering wheel 322, switches 324, and visual indicators. Three types of switches are illustrated. The first type has a simple light button 700 which is lit or flashes when the status of the sub-system is confirmed. It can also be lit when the button is first pressed. The second type has a simple button surrounded by a ring that is backlit and has a status led 704 which is lit or flashes when the status of the sub-system is confirmed. The third type 706 is a combination of the two. The light ring is backlit and the button is lit or flashes depending on the status of the sub-system. Other combinations of backlighting, switches and leds could be used to highlight the actual status of a corresponding subsystem.

Figure 5:
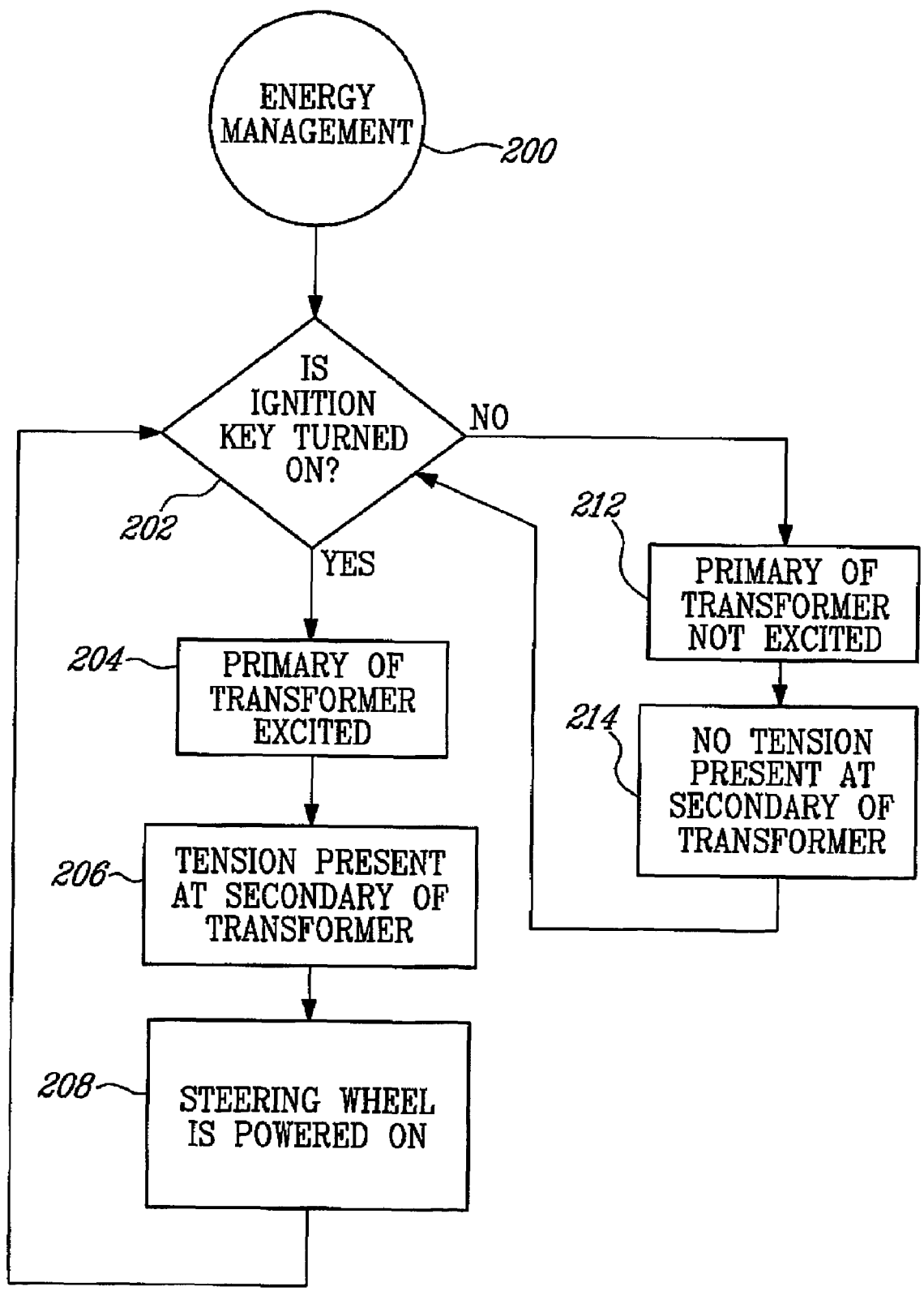
FIG. 5 is a flow chart of the main steps of the energy management method used in accordance with an embodiment of present invention.

With reference to FIG. 5, the main steps of the energy management will now be described. The energy management process is started 200. A verification is made as to whether the ignition key is turned on 202. If it is, the primary of the transformer is excited 204. Tension is then present at the secondary of the transformer 206. The steering wheel is then powered up 208. The process loops back to checking whether the ignition key is turned on 202. If the ignition key is not turned on 202, the primary of the transformer is not excited 212. There is therefore no tension present at the secondary of the transformer 214. The process loops back to checking whether the ignition key is turned on 202.

With reference to FIG. 6, the main steps carried out by the elements in the steering wheel will now be described. The status led on steering switches method starts 500. The steering switches are scanned by the switch controller 114 to verify if they have been activated 502. Depending on whether the switch was activated 504, the switch controller 114 either continues to scan the steering switches for activation 502 until a switch is activated or the switch controller 114 transmits a IR message corresponding to that switch command 506 from the steering wheel to the hub/dash using the IR circuitry discussed above. It further transmits a load status request to the hub/dash 507. The switch controller 114 starts a time counter A 508. It monitors the induced energy of the power input. If the power inputted is down 510, this constitutes a logical zero. If it is on, that is there is power being inputted to the processor, it constitutes a logical one. Therefore, as long as there is power inputted to the switch controller, the counter counts the number of seconds elapsed 512. Counter A is used to ensure that in case there is no interruption in the induced energy in a predetermined period of time, the process will stop monitoring the induced energy and will return to verifying the state of the switches. Preferably, the maximum waiting time for counter A is 10 milliseconds. Once it has counted up to this pre-set threshold value, it goes back to monitoring the switches. Therefore, time counter A may be referred to as being a status timer.

If the power input is detected to be down, a time counter B is started 514. A second check as to the power input is made 516. If the power is still down, the process loops back to monitoring the power. If the power input becomes on, the counter B is stopped 518. If the value of the counter B 520 is small, the status light for the activated switch is turned off 522. If the value is medium, the status light for the activated switch is turned on 524. If the value is large, the status light for the activated switch is blinked 526. Preferably, a short interruption lasts 3 milliseconds, a medium interruption lasts 6 milliseconds and a long interruption lasts 9 milliseconds. Preferably, counter B counts in multiples of 3 milliseconds. The process then continues for the next switch 528. Finally, the process loops back to reading the status of all switches. Therefore, time counter B may be referred to as being an interruption timer.

With reference to FIG. 7, the main steps carried out by the elements in the hub/dash will now be described. At initialization, all loads are turned off 600. A time counter C is started 602. The load controller 106 checks whether a switch command is received from the steering wheel 604. If there is no incoming message, the processor continues to wait for a message until a predetermined threshold wait period has elapsed 606. Preferably, this threshold wait period is a few seconds. It is only a safety check in case communication with the steering wheel is lost. Obviously, if numerous switches are provided on the steering wheel and checking their status takes more than a few seconds, the delay for turning off all loads will have to be increased. When it has elapsed, all loads are turned off 600 and the counter is reset 602. If a switch command is received by the load controller 106, the load controller verifies the type of message 608. If it is a command, the load controller 106 instructs the proper load on the boat to execute it 620. The load controller 106 then starts the time counter 602 and the verification for the reception of the IR message 604 starts again. Therefore, time counter C may be referred to as being a failure timer.

If the message type is a status request for a particular load, the load controller 106 verifies if the load is activated 610. If it is activated, the load controller 106 sends a medium pulse power interruption to the steering wheel to signify that the load is activated 618. If the load is not activated, a check is made as to whether the load is really not activated or simply not accessible or responsive 612. If the load really is not activated, a short pulse power interruption is sent to the steering wheel to signify that the load is not activated 614. Finally, if a confirmation that the load is not activated cannot be obtained, a long pulse power interruption is sent to the steering wheel to signify that the load is defective 616. The counter is then started again 602.

Therefore, the present invention provides a way to communicate information about the status of the loads controlled by the switches on the steering wheel without involving wires or another wireless transmission. The information is carried by the powering of the steering wheel, depending on the length of the power interruption.

FIG. 8 is a timing chart of the communication between the steering wheel processor and the dashboard hub processor. The events timeline lists the three example events which affect the power input to the steering wheel, thereby communicating status information from the marine vehicle to the steering wheel. The first event is the turning on of the #2 switch. The second event is a defect in load #3. The last event is the turning off of the #2 switch. The steering wheel transmits a plurality of messages to the hub as illustrated. The switch controller repeats the following steps: transmitting the switch activation information; requesting the status for load # i; and monitoring the power input from the marine vehicle to the steering wheel. However, at each repeat, i is incremented by one, so that it first monitors load #1, then load #2, then load #3, etc, until it reaches the last load which may be referred to as load #n; i is then reset to 1, and so forth. The power transferred from hub to steering time line represents the power input to the steering wheel. There are three power interruptions: a short one upon detection that load #1 is not activated, a medium one upon detection that load #2 is activated (following the load command) and a long one upon detection that load #3 is defective. Preferably, the interruption length ratios are referred to as: short: P/3, medium: 2P/3 and long: P.

The Status light #2 timeline indicates the state of the status light. A low signal means will turn the light off, and a high signal will turn the light on. Once the power interruption to the steering wheel has communicated that the load #2 is activated, the led for switch #2 is turned on.

As soon as the steering wheel transmits a message to the vehicle to activate load #2, the load #2 is turned on. Similarly, when the message is received that the load #2 should be de-activated, the load #2 is turned off.

Following detection that load #3 is defective and transmission of that information to the steering wheel by a long interruption of the power input to the steering wheel, the led #3 is made to blink until the problem is resolved.

Status indicator 1 is turned off all along, since the corresponding load is not activated.

It will be readily understood by a person skilled in the art that a status of some sub-systems of the boat is apparent to an operator of the boat. For example, if the radio switch is pressed on and the music does not begin, the operator will know right away that there is a problem with the radio sub-system. However, for certain sub-systems, the operator has no quick and safe way of determining the status and will benefit from such an indication of the status directly on the steering wheel.

As will be understood, the visual indication of the status of the sub-system could be replaced or complemented by a sound indication, especially in the case of vital sub-systems.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for indicating a status of a load of a sub-system in a marine vehicle, the load being controlled by a switch provided on a steering wheel of the marine vehicle, the method comprising:
   powering a switch controller via a transformer's secondary windings;
   providing said switch controller in said steering wheel for controlling communications between said steering wheel and said marine vehicle;
   providing a switch for said load on said steering wheel;
   providing a status indicator for said load on said steering wheel;
   detecting an activation of said switch by said switch controller;
   said switch controller transmitting a galvanically isolated command to said load in said marine vehicle in response to said activation;
   providing a load controller in said marine vehicle, said load controller controlling a power input to said switch controller, said load controller receiving said command and activating said load in response to said command;
   detecting a status of said load;
   pulsing a power input to said switch controller for a predetermined pulse duration corresponding to said detected status;
   said switch controller activating said status indicator to Indicate said detected status of said load.

2. The method for indicating a status of claim 1 wherein said transmitting is via Infrared transmission;
   said step of transmitting comprises
   creating a data train in response to said switch activation detection;
   and emitting said data train from said steering wheel; and
   said step of receiving comprises
   capturing said emitted data train in said vehicle; and
   extracting said command from said data train.

3. The method for Indicating a status of claim 1 further comprising:
   providing a status timer in the steering wheel;
   providing a status threshold value for said status timer;
   said switch controller requesting said status of said load;
   said switch controller starting said status timer upon said requesting;
   said switch controller carrying out said detecting an activation of said switch upon said status timer reaching said status threshold value.

4. The method for indicating a status of claim 1 further comprising:
   providing an pulse timer in the steering wheel;
   detecting said pulse of said power input;
   if said pulse is detected, starting said pulse timer,
   detecting an end of said pulse;
   if said end of pulse is detected, stopping said pulse timer;
   said pulse timer generating an pulse duration value;
   comparing said pulse duration value generated to said predetermined pulse duration; and
   wherein said step of activating said status indicator comprises
   activating said status indicator according to a result of said comparison.

5. The method for indicating a status of claim 4 wherein:
   said predetermined pulse duration is one of at least two predetermined pulse periods, each pulse period being associated to a different detected status of said load;
   said method further comprises
   providing at least two different types of activation, each activation type associated to a different one of said pulse periods;
   said step of comparing comprises
   comparing said pulse duration generated with each said predetermined pulse period,
   matching said pulse duration generated to one of said predetermined pulse period upon said comparison; and
   said step of activating said status indicator comprises
   activating said indicator to one of said activation type depending of said matched predetermined pulse period.

6. The method for indicating a status of claim 5 wherein each said activation type is one of lit, unlit, and flashing.

7. The method for indicating a status of claim 5 wherein
   said detected status is one of activated, not activated, and malfunctioning; and
   the corresponding predetermined period of time is one of short, medium and long.

8. The method for indicating a status of claim 7 wherein said short, medium and long predetermined periods of time are of 3 ms, 6 ms, and 9 ms, respectively.

9. The method for indicating a status of claim 1 wherein the marine vehicle has n subsystems each having a load controlled by a corresponding switch, the method further comprising the switch controller:
   requesting status information on load i;
   detecting said predetermined pulse duration of said power input corresponding to said detected status of said load i;
   incrementing i;
   repeating said steps of switch activation detecting; transmitting; receiving; load activating; requesting; status detecting; pulsing; pulse detecting; status indicator activating; and incrementing until i equals n+1; and
   resetting i to 1 when I=n+1.

10. The method for indicating a status of claim 9 further comprising: providing a failure timer in the marine vehicle;
    providing a failure threshold value for said failure timer being at least equal to a value of time required to carry out said steps of switch activation detecting; transmitting; receiving; load activating; requesting; status detecting; pulsing; pulse detecting; status indicator activating; and incrementing from i=1 to i=n+1;
    wherein said step of receiving further comprises
    starting said failure timer upon said receiving of said command;
    resetting all loads to a default state upon said failure timer reaching said failure threshold value.

11. A system for indicating a status of a load of a sub-system in a marine vehicle, the load being controlled by a switch provided on a steering wheel of the marine vehicle, the system comprising:
    a contactless rotary transformer for powering and for providing communications with a switch controller in said steering wheel, said switch controller for controlling communications between said steering wheel and said marine vehicle;
    a switch for activating a load of said sub-system, located on said steering wheel;
    a status indicator for said load, on said steering wheel;
    a switch detector for detecting an activation of said switch;
    a transmitter for transmitting a galvanically isolated command corresponding to said switch activation to said load, In said marine vehicle, in response to said switch detector;

a load controller in said marine vehicle, said load controller controlling a power input to said switch controller, said load controller receiving said command and activating said load in response to said command;

a status detector for detecting a status of said load;

a power pulser for pulsing a power Input to said switch controller for a predetermined pulse duration corresponding to said detected status;

wherein said switch controller activates said status indicator to indicate said detected status of said load.

12. The system for indicating a status of claim 11 wherein said status indicator is one of a backlight, a lighting ring, and a LED provided with said switch.

13. The system for indicating a status of claim 11 wherein the status indicator is an audible indicator.

14. The system for indicating a status of claim 11 wherein the transmitter comprises a data driver in said steering wheel for creating a data train for the command; and an infrared emitting diode for emitting the data train from said steering wheel.

15. The system for indicating a status of claim 14 further comprising:

a phototransistor in said marine vehicle for capturing the data train emitted; and a signal receiver for receiving the data train captured; extracting the command from said data train; and providing the command to the load controller.

16. The system for indicating a status of claim 11 further comprising:

a transformer having
a primary in the marine vehicle, and
a secondary In the steering wheel; and whereby the transformer induces the power input from the marine vehicle to the steering wheel.

17. The system for indicating a status of claim 11 wherein the switch detector is provided as part of the switch controller, and the status detector and the power pulse are provided as part of the load controller.

18. The system for indicating a status of claim 11 further comprising:

a status timer In the steering wheel;

a status threshold value for the status timer;

and a status requestor for requesting said load status;

a status timer starter for starting the status timer according to said status requestor; and the status timer activating said switch detector upon reaching said status threshold value.

19. The system for indicating a status of claim 11 further comprising:

an pulse detector for detecting a beginning and an end of said interruption;

an pulse timer activatable by said pulse detector for measuring an pulse duration value corresponding to a value of time between said beginning and said end of said pulse;

a comparator for comparing the pulse duration value generated to said predetermined pulse duration; and wherein the switch controller activates the status indicator to indicate said detected status according to a result of said comparing.

20. The system for indicating a status of claim 11 wherein the marine vehicle has n subsystems each having a load being controlled by a corresponding switch, the system further comprising:

a status requester for requesting a status information of a load i;

an pulse detector to detect said predetermined pulse duration corresponding to said detected status of said load i;

an incrementer to increment i;

an alternation controller that controls the switch controller to repeatedly activate the switch detector, transmitter, load controller, status detector, status requester, status detector, power pulser, pulse detector, status indicator and incrementer until i equals n+1; and resets i when i=n+1.

21. The system for indicating a status of claim 20 further comprising:

a failure timer In the marine vehicle, a failure threshold value for the failure timer, being at least equal to a value of time required for said switch controller to be controlled to carry out said steps of repeatedly activating the switch detector, transmitter, load controller, status detector, status requester, status detector, power pulser, pulse detector, status Indicator and incrementer from i=1 to i=n+1;

a failure timer starter for starting said failure timer upon said load controller receiving said command;

a load resetter for resetting all loads to a default state upon said failure timer reaching said failure threshold value.

* * * * *